US010719394B2

(12) United States Patent
Chen et al.

(10) Patent No.: US 10,719,394 B2
(45) Date of Patent: Jul. 21, 2020

(54) SYSTEMS AND METHODS FOR FAST ACCESS OF NON-VOLATILE STORAGE DEVICES

(71) Applicant: Innogrit Technologies Co., Ltd., Shanghai (CN)

(72) Inventors: Jie Chen, Milpitas, CA (US); Zining Wu, Los Altos, CA (US)

(73) Assignee: Innogrit Technologies Co., Ltd., Shanghai (CN)

( * ) Notice: Subject to any disclaimer, the term of this patent is extended or adjusted under 35 U.S.C. 154(b) by 15 days.

(21) Appl. No.: 15/943,323

(22) Filed: Apr. 2, 2018

(65) Prior Publication Data

US 2019/0121696 A1    Apr. 25, 2019

Related U.S. Application Data

(60) Provisional application No. 62/577,008, filed on Oct. 25, 2017.

(51) Int. Cl.
*G06F 11/10* (2006.01)
*G06F 12/06* (2006.01)

(52) U.S. Cl.
CPC ...... *G06F 11/1068* (2013.01); *G06F 12/0607* (2013.01)

(58) Field of Classification Search
CPC .. G06F 11/1068; G06F 11/10; G06F 12/0607; H01L 24/19; H01L 25/50; H01L 27/146; H03M 13/1515
See application file for complete search history.

(56) References Cited

U.S. PATENT DOCUMENTS

| | | | | |
|---|---|---|---|---|
| 2009/0240873 A1* | 9/2009 | Yu | ............ | G06F 3/0608 711/103 |
| 2012/0030408 A1* | 2/2012 | Flynn | ............ | G06F 12/0246 711/102 |
| 2015/0349807 A1* | 12/2015 | Vernon | ............ | H03M 13/353 714/774 |
| 2016/0110252 A1* | 4/2016 | Hyun | ............ | G11C 29/52 714/766 |
| 2017/0269991 A1 | 9/2017 | Bazarsky et al. | | |
| 2019/0188073 A1* | 6/2019 | Motwani | ............ | H03M 13/3761 |

* cited by examiner

*Primary Examiner* — Cynthia Britt
(74) *Attorney, Agent, or Firm* — IPro, PLLC

(57) ABSTRACT

Systems, apparatus and methods are provided for providing fast non-volatile storage access with ultra-low latency. A method may comprise receiving data pieces from a plurality of channels of a non-volatile storage device, assembling the data pieces into one or more error correction code (ECC) encoded codewords, and triggering an ECC engine to decode a codeword to generate decoded data to be returned to a host when the codeword is assembled. Each codeword may have data pieces retrieved from different channels. Thus, a data unit containing one or more ECC codewords may be spread into multiple channels of a non-volatile storage device and access latency may be improved by accessing multiple channels in parallel. An averaging effect may be achieved for an ECC codeword and ECC failures may be reduced. Fast NANDs implementing the techniques disclosed herein may achieve ultra-fast access and response time while maintaining a high throughput.

21 Claims, 12 Drawing Sheets

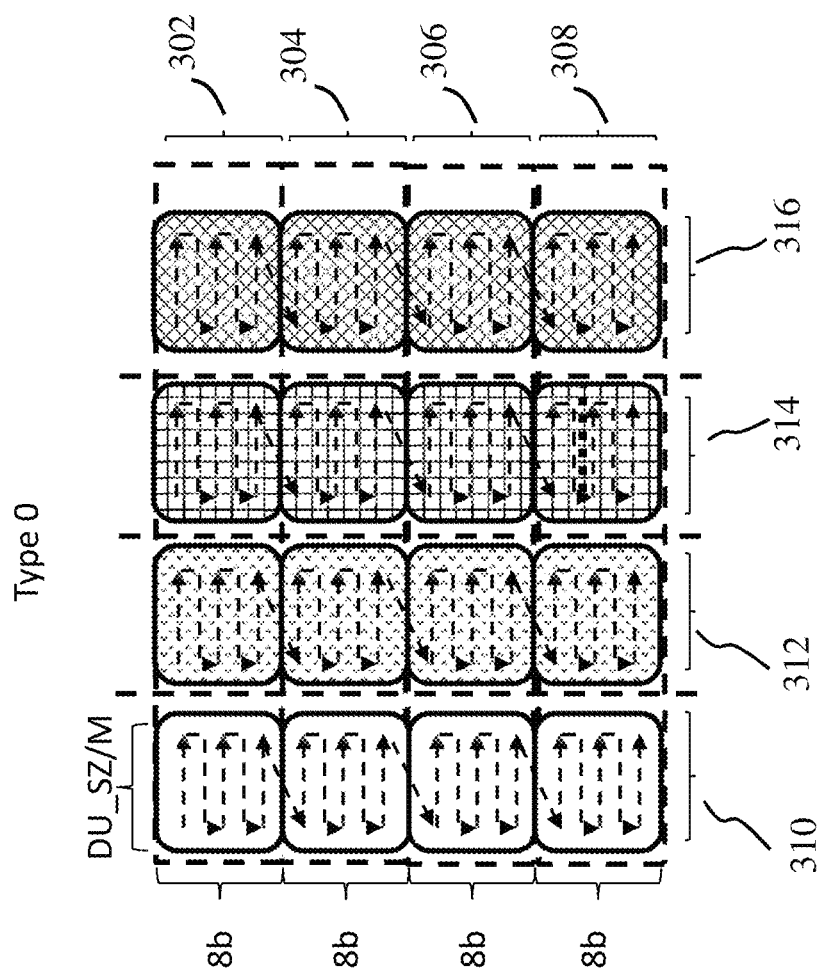

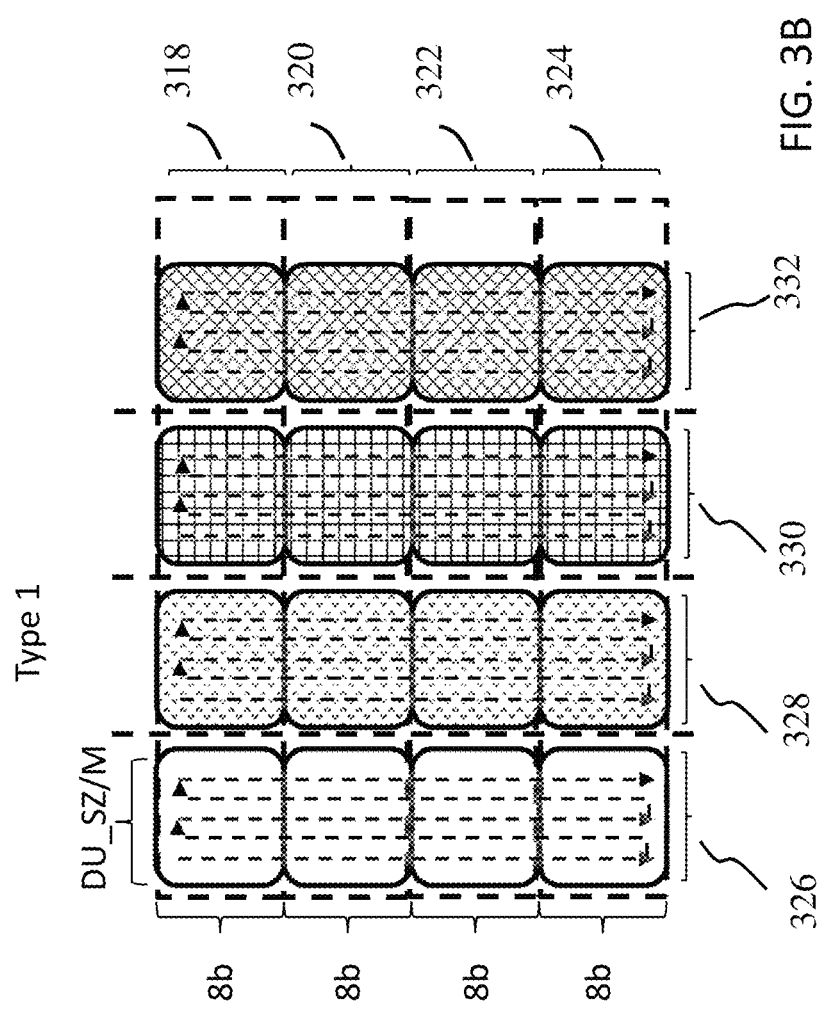

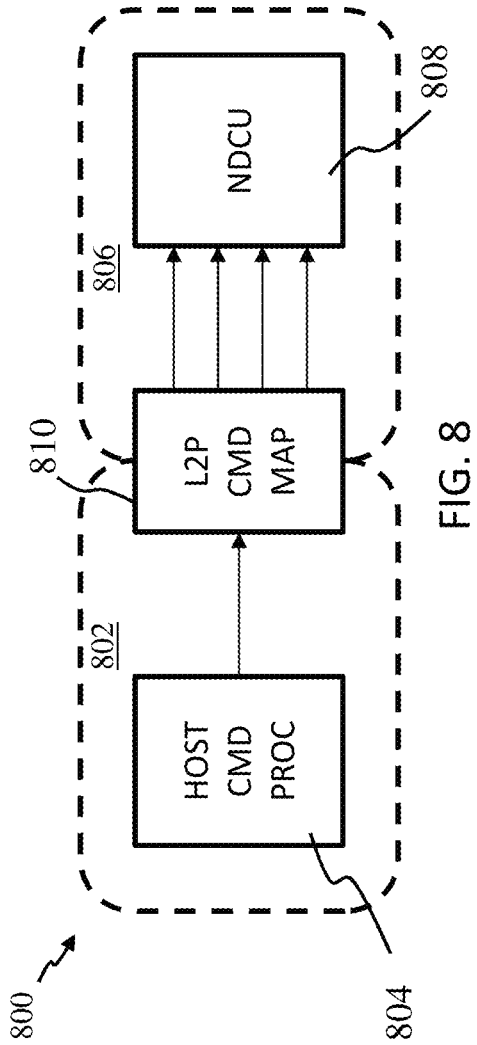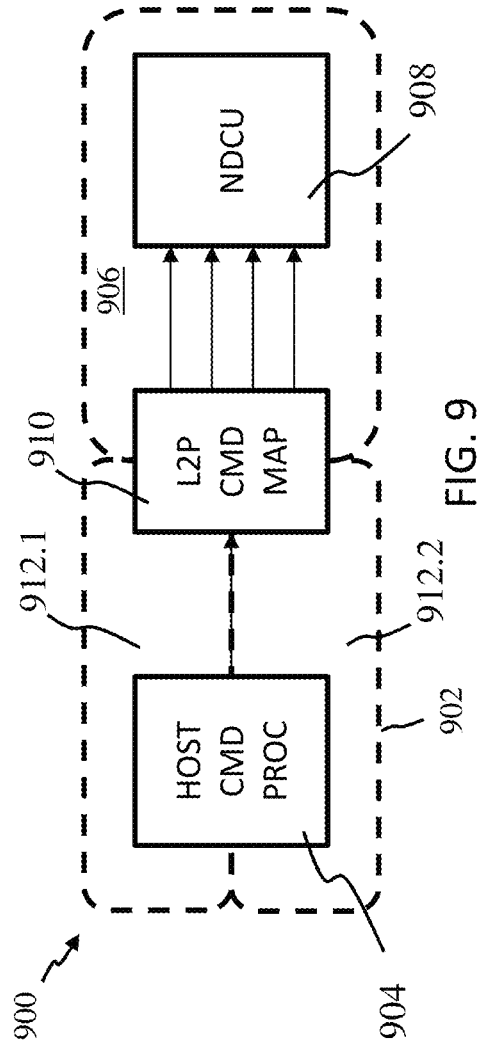

SYSTEMS AND METHODS FOR FAST ACCESS OF NON-VOLATILE STORAGE DEVICES

RELATED APPLICATION FIELD

The application claims priority to U.S. Provisional Application 62/577,008, filed Oct. 25, 2017, entitled "FAST NAND ACCESS WITH ULTRA LOW LATENCY," the content of which is hereby incorporated by reference in its entity.

TECHNICAL FIELD

The disclosure herein relates to non-volatile storage, particularly relates to fast NAND access with ultra-low latency.

BACKGROUND

Computing systems have traditionally used a wide variety of non-volatile storage devices to maintain and store data and instructions, for example, floppy disks, hard drives, magnetic tapes, optical discs. More recently, non-volatile NAND storage devices have gained wide usage in memory cards, USB flash drives and solid-state drives (SSDs). Although compared to the more traditional non-volatile storage devices, NAND devices can provide high throughput by conventional channel-level parallelism, die-level parallelism, or plane-level parallelism, access latency still exists and can be improved.

SUMMARY

The disclosed subject matter relates to systems, methods, and devices that provide fast read/write access to a non-volatile storage device by reducing latency. According to various aspects of the subject innovation, the provided techniques may spread a data unit into multiple channels of a non-volatile storage device and improve the latency by access multiple pieces of the data unit via multiple channels in parallel. Moreover, the provided techniques may spread an ECC codeword into multiple non-volatile storage dies to achieve an averaging effect and reduce ECC failures.

In an exemplary embodiment, there is provided a method for reading data from a non-volatile storage device. The method may comprise: receiving data pieces from a plurality of channels of the non-volatile storage device, assembling the data pieces into one or more error correction code (ECC) encoded codewords, and triggering an ECC engine to decode a codeword to generate decoded data to be returned to a host when the codeword is assembled. Each codeword may have data pieces retrieved from different channels.

In another exemplary embodiment, there is provided a method for programming data to a non-volatile storage device. The method may comprise: encoding data received from a write command into a plurality of codewords, storing a plurality of data units formed by the plurality of codewords in a buffer, breaking each of the plurality of data units into a plurality of data pieces, mapping each of the plurality of data pieces of a data unit into one of the plurality of channels, and transmitting each of the plurality of data pieces of the data unit into one of the plurality of channels to be stored in a die of a respective channel. Each codeword may be broken into multiple pieces and data pieces of one codeword may be spread into multiple channels.

In yet another exemplary embodiment, there is provided a controller comprising an error correction code (ECC) engine configured to encode data into codewords and decode the codewords, a buffer to store data units formed by the codewords, a cross-channel bridge to distribute a plurality of pieces of a data unit (DU) to a plurality of channels of a non-volatile storage device for a write operation and assemble the plurality of pieces retrieved from the plurality of channels for a read operation. Each of the plurality of pieces of the DU may be stored in a separate die of a different channel of the plurality of channels. The controller may further comprise a channel synchronizer to balance data unit pieces received from different channels and trigger the ECC engine whenever a ECC codeword is received.

In yet another exemplary embodiment, there is provided a non-transitory machine-readable medium having information, wherein the information, when read by a hardware processor system, causes the hardware processor system to perform: receiving data pieces from a plurality of channels of a non-volatile storage device, assembling the data pieces into one or more error correction code (ECC) encoded codewords, each codeword having data pieces retrieved from different channels, and triggering an ECC engine to decode a codeword to generate decoded data to be returned to a host when the codeword is assembled.

BRIEF DESCRIPTION OF FIGURES

FIG. 3A schematically shows a plurality of data units stored into a plurality dies of different channels in accordance with an embodiment of the present disclosure.

FIG. 3B schematically shows a plurality of data units stored into a plurality dies of different channels in accordance with another embodiment of the present disclosure.

FIG. 8 schematically shows a storage controller implementing a mapping between a logical channel domain and a physical channel domain in accordance with an embodiment of the present disclosure.

FIG. 9 schematically shows a storage controller implementing a mapping between a logical channel domain and a physical channel domain in accordance with another embodiment of the present disclosure.

DETAILED DESCRIPTION

Figure 1:
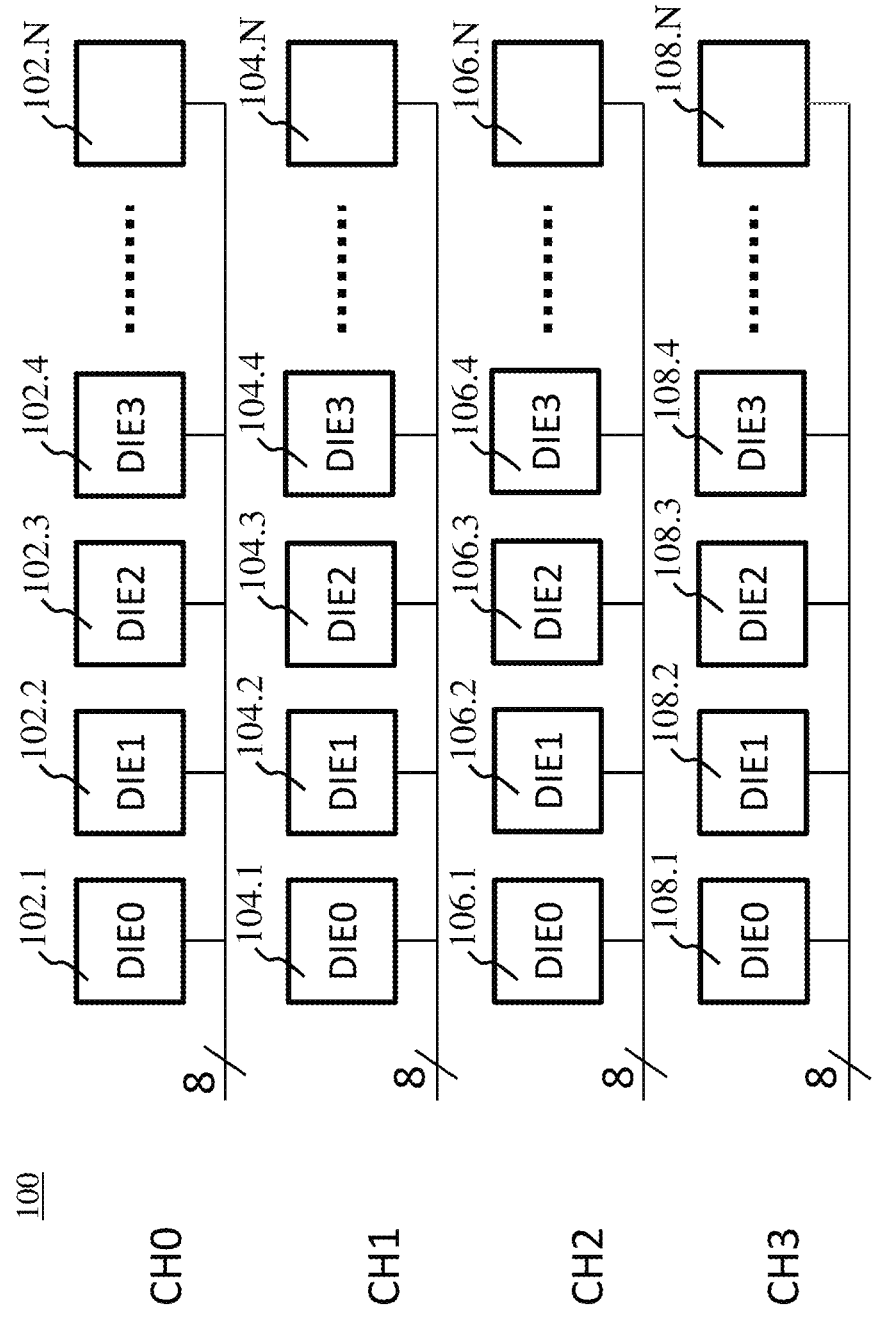
FIG. 1 schematically shows a multi-channel NAND storage device in accordance with an embodiment of the present disclosure.

Specific embodiments according to the present disclosure will now be described in detail with reference to the accompanying figures. Like elements in the various figures are denoted by like reference numerals for consistency.

The present disclosure provides systems and methods for fast access to non-volatile storage devices with ultra-low latency. As used herein, a non-volatile memory device may be a computer storage device that can maintain stored information after being powered off, and the stored information may be retrieved after being power cycled (turned off and back on). Non-volatile storage devices may include floppy disks, hard drives, magnetic tapes, optical discs, NAND flash memories, NOR flash memories, magnetoresistive random Access Memory (MRAM), resistive random access memory (RRAM), phase change random access memory (PCRAM), Nano-RAM, etc. In the description, we use a NAND flash as an example for the proposed fast access techniques. However, various embodiments according to the present disclosure may implement the techniques with other types of non-volatile storage devices.

An embodiment according to the present disclosure may provide ultra-low access time and improve the response time for a non-volatile storage device by a factor depending on a number of channels of the non-volatile storage device. For example, for a M-channel non-volatile memory device, the response time may be improved by a factor of M. A buffer, for example, a memory bank with high bandwidth, may be used to increase the memory efficiency and further reduce the overall hardware cost. A cross-channel bridge may be provided between the buffer and dies of the non-volatile storage device. The cross-channel bridge may distribute pieces of a data unit (DU) (which may be referred to as data unit pieces or data pieces) to the channels for a write operation and assemble pieces retrieved from channels for a read operation. The pieces of a DU may be assembled according to its original position in the DU. For example, if a first piece of DU was written to a first channel, then the first piece of data read from the first channel may be positioned as the first piece of DU for assembly. Moreover, a data synchronizer (also may be referred to as a channel synchronizer) may be used to balance the data unit pieces received from different channels so that an error correction code (ECC) engine may be triggered whenever one ECC codeword is received while other data pieces for another ECC codeword may still being received. In an embodiment, the ECC engine may be a multi-core ECC engine to reduce the processing time for each data unit.

Embodiments according to the present disclosure may spread an ECC codeword into multiple NAND dies to achieve an averaging effect, therefore reducing ECC failures. Fast NANDs implementing the techniques disclosed herein may achieve ultra-fast access and response time while maintaining a high throughput.

FIG. 1 schematically shows an exemplary multi-channel NAND storage device 100 according to an embodiment. The NAND storage device 100 may comprise a plurality of channels CH0, CH1, CH2 and CH3. Each channel may comprise a plurality of dies. For example, the channel CH0 may comprise N dies: 102.1, 102.2, 102.3, 103.4, and so on through 102.N; the channel CH1 may comprise N dies: 104.1, 104.2, 104.3, 104.4, and so on through 104.N; the channel CH2 may comprise N dies: 106.1, 106.2, 106.3, 106.4, and so on through 106.N; and the channel CH3 may comprise N dies: 108.1, 108.2, 108.3, 108.4, and so on through 108.N. The number N may represent a total number of dies in one channel. In an embodiment, the number N may be 2, 4, 6, 8, or more, and not necessarily an even number. It should be noted that the four channel NAND device 100 may be just an example for a more general M-channel embodiment, in which M may be 2, 4, 6, 8, 10, 12, etc. In some embodiments, M may not necessarily be an even number, for example, M may be 3, 5, 7, 9, etc. Moreover, FIG. 1 shows that each channel may have a bandwidth of 8 bits. This is an example and embodiments according to the present disclosure may have a bandwidth of L bits, where L may be 2, 4, 8, 16, or other suitable number.

Figure 2:
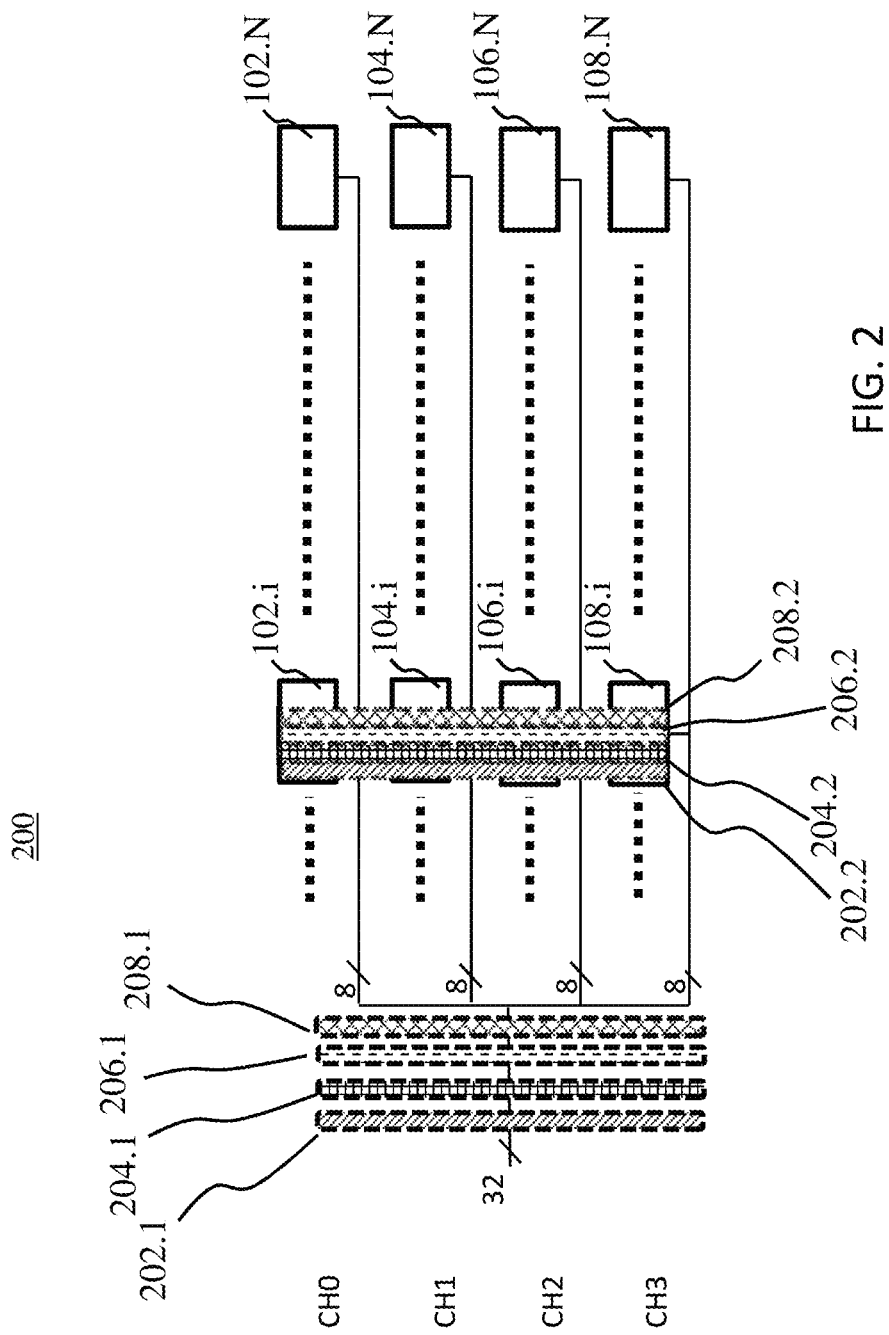
FIG. 2 schematically shows a plurality of data units being stored in a multi-channel NAND storage device in accordance with an embodiment of the present disclosure.

FIG. 2 schematically shows a storage system 200 with a plurality of data units being stored in a multi-channel NAND storage device in accordance with an embodiment of the present disclosure. The storage system 200 may comprise a NAND storage device such as the NAND storage device 100 shown in FIG. 1. The NAND storage device may be coupled to a storage system controller (not shown) via a super channel (also may be referred as a super bus) of a bandwidth M×L bits, where M may be the number of channels of the NAND storage device and L may be the bandwidth of each channel. During a program operation (also known as a write operation), a plurality of data units 202.1, 204.1, 206.1 and 208.1 may be received via a super channel (e.g., 32 bits as shown in the example of FIG. 2). Each of the data units 202.1, 204.1, 206.1 and 208.1 may be split and spread out into M channels (e.g., four 8 bits channel) and thus, each of the data units may be stored across M dies in different channels. For example, the data unit 202.1 may be stored as a data unit 202.2 in the NAND storage device with a first piece being stored in die 102.$i$ of channel CH0, a second piece being stored in die 104.$i$ of channel CH1, with a third piece being stored in die 106.$i$ of channel CH2, and a fourth piece being stored in die 108.$i$ of channel CH3. The lower case "i" may denote one of N dies of a channel. Similarly, the data unit 204.1 may be stored as a data unit 204.2 and spread into four pieces in dies 102.$i$, 104, I, 106.$i$ and 108.$i$ of four different channels; the data unit 206.1 may be stored as a data unit 206.2 and spread into four pieces in dies 102.$i$, 104, I, 106.$i$ and 108.$i$ of four different channels; and the data unit 208.1 may be stored as a data unit 208.2 and spread into four pieces in dies 102.$i$, 104, I, 106.$i$ and 108.$i$ of four different channels.

Although not shown, each die of a NAND storage device may comprise a plurality of pages, which may be arranged in one or more planes. In some embodiments, programming of a NAND storage device may be page based. That is, data may be programmed to the physical storage (e.g., dies of M channels) on a page by page process with one page being the smallest unit of programming. In one embodiment, a controller for the NAND storage device may provide a suspension mode of operation such that data may be buffered at the controller such that M pages of data (e.g., enough data to fill M separate pages in M different dies of M channels) may be programmed to the NAND storage device in one program operation with each page of data be programmed in one die of a different channel. In another embodiment, the suspension mode may not be provided by a controller for the NAND storage (e.g., disabled or not implemented), and padding may be provided such that data may be programmed to the NAND storage device even if the data cannot fill M pages (e.g., with padding for unfilled storage cells of a page).

In some embodiments, data stored in a NAND storage device may be error correction code (ECC) encoded codewords. In an embodiment, a data unit (e.g., 202.1, 204.1, 206.1 and 208.1) may be one or more codewords as long as a codeword may be split into more than one channels. For example, in one embodiment, a data unit (e.g., 202.1, 204.1, 206.1 and 208.1) may be one ECC codeword and such an ECC codeword may be split and stored in four different dies in four different channels. In another embodiment, a data unit (e.g., 202.1, 204.1, 206.1 and 208.1) may comprise two ECC codewords and each ECC codeword may be split and stored in two different dies in two different channels. In various embodiments, spreading an ECC codeword through multiple NAND dies may achieve an averaging effect, and therefore may reduce ECC failures.

FIG. 3A schematically shows a plurality of data units stored into a plurality dies of different channels in accordance with an embodiment of the present disclosure. A data unit may be split into M pieces with a first piece containing the first 1/M portion of the data unit, a second piece containing the second 1/M portion of the data unit, and so on. As shown in FIG. 3A, four channels 302, 304, 306 and 308 may each store one quarter (e.g., data unit size (DU_SZ) divided by M=4) of the data units 310, 312, 314 and 316, respectively. Each quarter of a data unit may contain DU_SZ/M consecutive bits of one data unit. In one embodiment, this scheme of dividing one data unit into M channels may be referred to as "type 0" storage.

FIG. 3B schematically shows a plurality of data units each stored into a plurality dies of different channels in accordance with another embodiment of the present disclosure. In this embodiment, a data unit may be split into M interleaved pieces. For example, one piece may contain the first bit, the (M+1)-th bit, the (2M+1)-th bit, and so on; another piece may contain the second bit, the (M+2)-th bit, the (2M+2)-th bit, and so on; until the last piece may contain the M-th bit, 2M-th bit, and so on. As shown in FIG. 3B, four channels 318, 320, 322, 324 may each store one quarter of the data units 326, 328, 320 and 322. In contrast to FIG. 3A, a quarter of the data unit 326 may contain DU_SZ/M interleaved bits of one data unit. In one embodiment, this scheme of dividing one data unit into M channels may be referred to as "type 1" storage.

Figure 4:
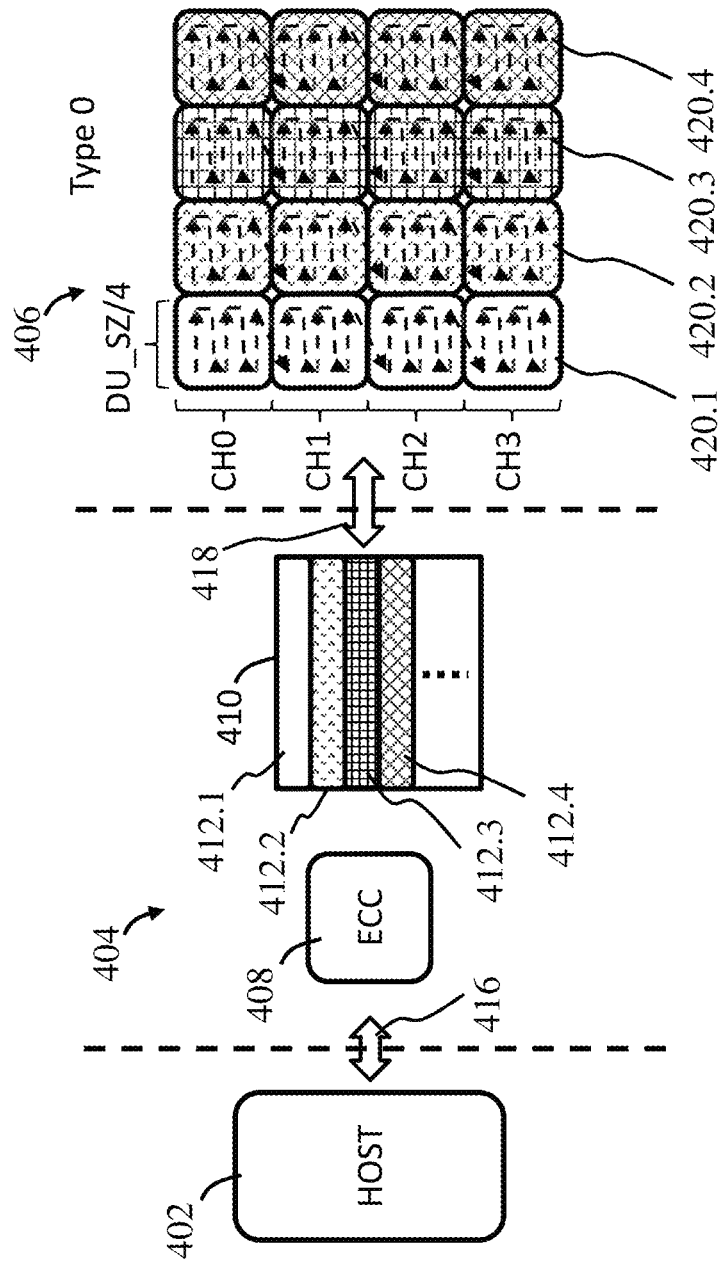
FIG. 4 schematically shows a NAND storage system in accordance with an embodiment of the present disclosure.

FIG. 4 schematically shows a storage system 400 in accordance with an embodiment of the present disclosure. The storage system 400 may comprise a storage controller 404 and a NAND storage device 406. The storage controller 404 may be coupled to a host 402 via an interface 416. The interface 416 may be one of many currently used or yet to be developed interfaces, such as, but not limited to, Serial AT Attachment (SATA), Parallel ATA (PATA), PCI Express (PCI-E), Secure Digital (SD), Universal Serial Bus (USB), etc. In the embodiment shown in FIG. 4, as an example, the NAND storage device 406 may be a four channel NAND device with a plurality of data units 420.1, 420.2, 420.3 and 420.4 each being stored across dies in different channels in a type 0 scheme. The storage system 400 may be implemented in memory cards, USB flash drives and solid-state drives in various embodiments to provide non-volatile storage for the host 402.

The storage controller 404 may further be coupled to the NAND storage device 406 via a channel synchronizer and cross-channel bridge 418, which may comprise a cross-channel bridge and a channel synchronizer. The cross-channel bridge may distribute pieces of a DU to the channels for a write operation and assemble pieces retrieved from the channels for a read operation. In one embodiment, the pieces retrieved from the channels may be assembled according to its original position in the DU. For example, if the 1$^{st}$ piece of DU was written to a first channel then the 1$^{st}$ piece of data read from the first channel may be positioned as the 1$^{st}$ piece of DU for assembling.

The channel synchronizer may be used to balance the data unit pieces received from different channels so that the ECC engine 408 may be triggered whenever an ECC codeword is received while data pieces for other ECC codewords is still being receiving. In an embodiment that a DU may comprise multiple ECC codewords, some channels may receive data unit pieces earlier than others. For example, a data unit may comprise two ECC codewords, with each ECC codeword spread into two channels. During a read operation, all pieces of a first ECC codeword may be received earlier than at least one piece of a second ECC codeword and the ECC engine 408 may be triggered to decode the first ECC codeword while the at least one piece of the second EC codeword may be still being received. For example, channels CH 0 and CH 1 may retrieve pieces of a data unit earlier than channels CH 2 and CH 3. The data unit may comprise a first ECC codeword stored in channels CH 0 and CH 1, and a second ECC codeword stored in channels CH 2 and CH 3. Therefore, the ECC engine 408 may start to decode the first ECC codeword while not all pieces of the second ECC codeword have been received.

In some embodiments, the channel synchronizer may also be designed to monitor and synchronize data traffic on M channels, and locate the first set of available aligned pages across M channels for M×Q pages of data to be stored, where Q may be the number of outstanding logical command(s) from a HOST. In one embodiment, Q may correspond to the number of page read or write command from a host. The benefit of having this synchronizer is to reduce the huge memory bank usage and hold any incomplete ECC codeword in the NAND page buffer.

In addition to the interface 416 and the channel synchronizer and cross-channel bridge 418, the controller 404 may further comprise an ECC engine 408 and a storage buffer 410. The ECC engine 408 may be configured to encode data from the host 402 into ECC codewords to be stored in the NAND storage device 406 and decode ECC codewords retrieved from the NAND storage device 406 into data for the host 402. In an embodiment, the ECC engine 408 may be a multi-core ECC engine that may have an ultra-high bandwidth to serve M channel data traffic and may be controlled based on a task queue to handle the potential output data out-of-order.

In some embodiments, the storage buffer 410 may be a memory bank with high bandwidth. In one embodiment, the storage buffer 410 may be shared with both write ("PROG") and READ paths due to the fact that one physical channel can either be occupied by PROG or READ data traffic. During a program operation, the storage buffer 410 may temporarily store the encoded data, for example, ECC codewords 412.1, 412.2, 412.3 and 412.4, before these codewords being transmitted to the four channels and stored as data units 420.1, 420.2, 420.3 and 420.4 in the four channels. During a read operation, the storage buffer 410 may be used to temporarily store pieces of data units retrieved from the channels and assembled into ECC codewords.

Figure 5:
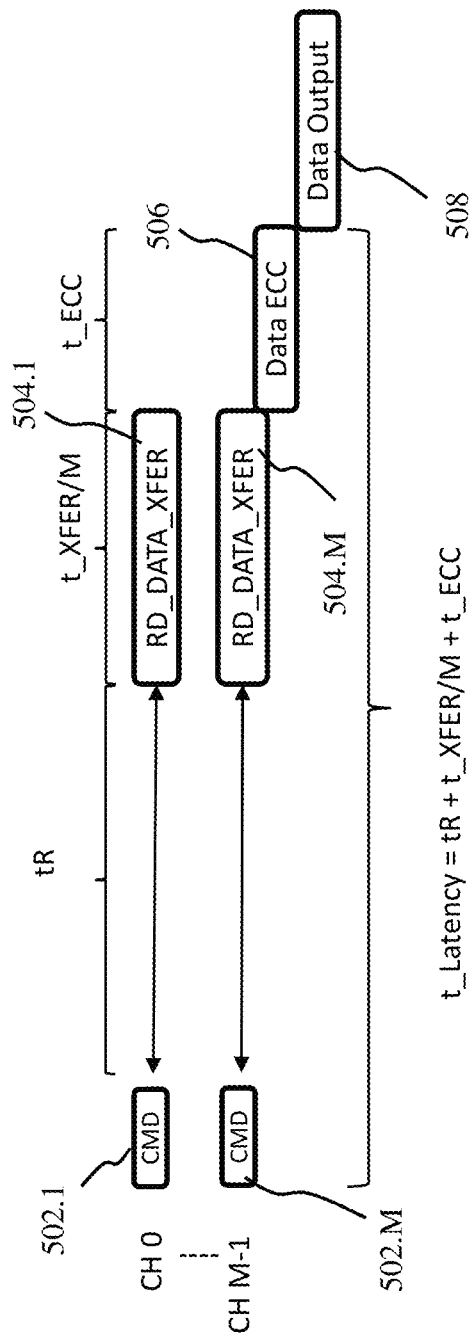
FIG. 5 schematically shows latency for a NAND storage system in accordance with an embodiment of the present disclosure.

FIG. 5 schematically shows latency for a NAND storage system to perform a read operation in accordance with an embodiment of the present disclosure. Read commands, for example CMD 502.1 through CMD 502.M, may be issued on M channels CH 0 through CH M−1 respectively. Each channel may take a period of time tR to get ready to transfer data. In contrast to a convention system that may need a period of time t_XFER to transfer a data unit to a controller, each of the plurality of channels CH 0 through CH M−1 may take a period of time t_XFER/M for operations RD_DATA_XFER 504.1 through RD_DATA_XFER 504.M to transfer a respective piece of data unit to a controller. The controller may invoke an ECC engine as soon as M pieces of a data unit have been received and the ECC engine may generate an ECC output 506 after a period of time t_ECC. The final data output 508 may thus be generated after a latency of t_Latency=tR+t_XFER/M+t_ECC. In contrast, a conventional NAND storage system may generate an output after a latency of tR+t_XFER+t_ECC.

Therefore, embodiments may improve the response time of a NAND storage system by transferring each Data Unit (DU) on a super channel, which may be M times the channel width. For example, for a channel bit width of 8 bits and four channels, the super channel may be 4×8=32 bits wide. Accordingly, the transfer time may be significantly reduced (e.g., t_XFER/M, where M is the number of NAND channels), which may improve the response time (for example, the READ response time, especially when tR is very short). The overall bandwidth of a NAND storage system according to an embodiment may be the same as a conventional NAND storage system with a same size NAND storage device, and there may be no extra cost (such as number of pins or bus-width).

Figure 6:
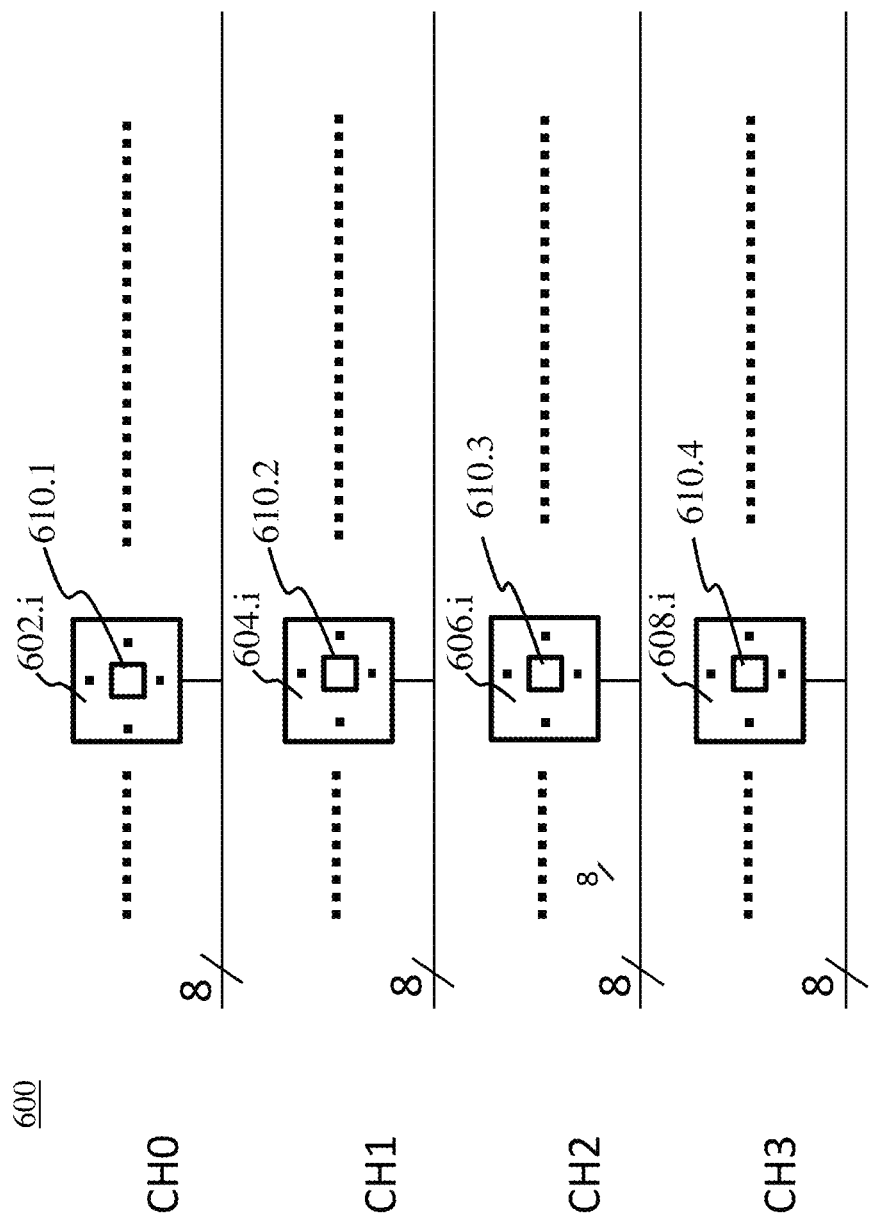
FIG. 6 schematically shows a multi-channel NAND storage device in accordance with another embodiment of the present disclosure.

FIG. 6 schematically shows a multi-channel NAND storage device 600 in accordance with another embodiment of the present disclosure. The multi-channel NAND storage device 600 may be an embodiment of the NAND storage device 100, and may comprise M channels with M being 4 in the example shown. Each channel may comprise N dies with N being an integer larger than one. Exemplary die 602.i may represent the i-th die of channel CH0, exemplary die 604.i may represent the i-th die of channel CH 1, exemplary die 606.i may represent the i-th die of channel CH 2, and exemplary die 608.i may represent the i-th die of channel CH 3. Each die may comprise multiple pages. The pages located at the same position in different dies in different channels may be referred to collectively as a set of aligned pages or a super page. For example, the page 610.1 of die 602.i, the page 610.2 of die 604.i, the page 610.3 of die 606.i and the page 610.4 of die 608.i may be located in the same position of different dies of different channels. In some embodiments, the pages 610.1 through 610.4 (or more generally 610.1 through 610.M for a M channel NAND storage device) may form one super page. The size of a super page may be the size of a physical page times M (e.g., physical_page_size×M). One super page may be programmed as a unit. For example, a channel synchronizer in the channel synchronizer and cross-channel bridge 418 may monitor and synchronize data traffic from M channels, and locate the first available super page across M channels for M×Q, where Q is the number of outstanding logical command(s) from HOST.

Figure 7:
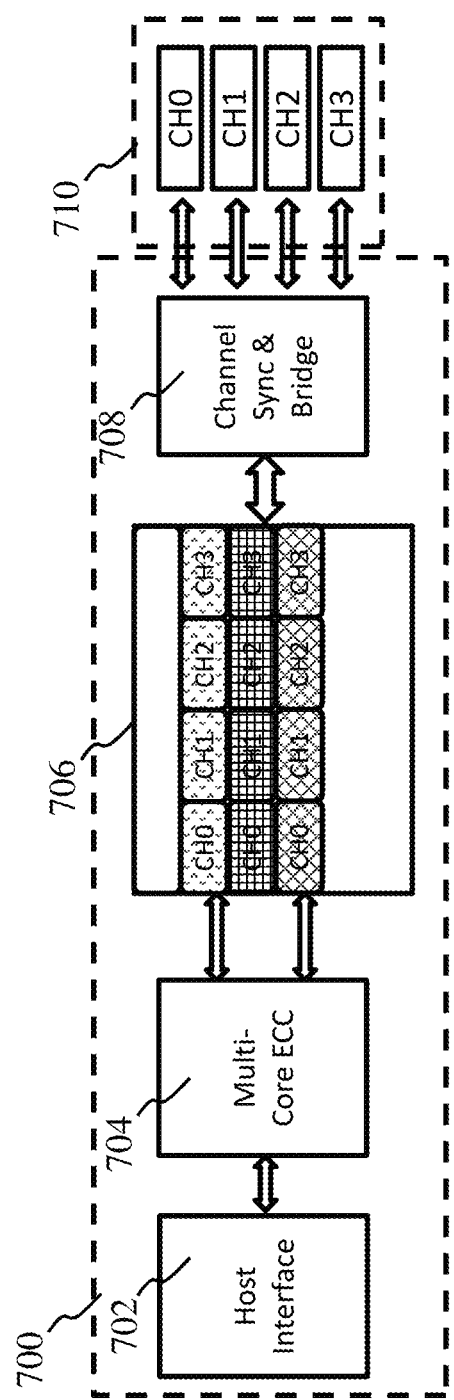
FIG. 7 schematically shows a storage controller in accordance with an embodiment of the present disclosure.

FIG. 7 schematically shows a storage controller 700 in accordance with an embodiment of the present disclosure. The controller 700 may be an embodiment of the controller 404. The controller system 700 may comprise a host interface 702, a multi-core ECC 704, a buffer 706 and a channel synchronizer and bridge 708. The host interface 702 may be an example of the interface 416. The multi-core ECC may be an example of the ECC 408. The buffer 706 may be an example of the storage buffer 410, and the channel synchronizer and bridge 708 may be an example of the channel synchronizer and cross-channel bridge 418. The controller 700 may be coupled to a NAND storage device 710, which may comprise a plurality of channels CH 0, CH 1, CH 2 and CH 3. In various embodiments, the storage controller 700 and the NAND storage device 710 may be enclosed in non-volatile storages, such as, but not limited, memory cards, USB flash drives and solid-state drives (SSDs).

FIG. 8 schematically shows a storage controller 800 implementing a mapping between a logical channel domain 802 and a physical channel domain 806 in accordance with an embodiment of the present disclosure. The storage controller 800 may be an embodiment of the controller 404 or 700. The logical channel domain 802 may comprise a host command processor 804. The physical channel domain 806 may comprise a NAND device controller unit 808. A logical to physical command mapping module 810 may be positioned between the logical channel domain 802 and the physical channel domain 806 to perform the logical to physical translation. In one embodiment, a HOST may treat an exemplary M-channel NAND storage system having a controller 800 as a virtual one-channel device, with a super page size=physical_page_size×M. The HOST may issue a host read or write command to the controller 800. The host command processor 804 in the logical channel domain may be responsible to process the host command to generate parameters corresponding to a logical channel domain and issue a logical page READ or WRITE command. For example, the parameters for the logical channel domain may include the device identifier (DEV_ID), row address (ROW_ADDR), column address (COL_ADDR), transfer count (XFCNT), etc.

To perform a host READ command, when a logical page READ command is issued, the logical to physical command mapping module 810 may parse the logical information such as DEV_ID, ROW_ADDR, COL_ADDR, XFCNT, etc, and split the single logical READ operation into M sub-READ operations over M physical channels with the physical information: DEV_ID, ROW_ADDR, COL_ADDR/M, XFCNT/M, etc. The M sub-READ operations may be carried out by the NAND device controller unit 808 in the physical channel domain 806. The controller 800 may check the data availability from each physical channel and request the HOST to perform data transfer using the logical channel information. Once the request is confirmed, the controller 800 may enter a data transfer state with M-channel data transfer in parallel. In one embodiment, a synchronization bridge (e.g., in the channel synchronizer and cross-channel bridge 418 or 708) and memory bank (e.g., storage buffer 410 or 706) may be used to align and combine M partial data pieces into one complete DU. Once an DU is completely received, a high performance ECC engine may be activated to perform ECC decoding.

In one example, assuming each physical page has a size of 16 KB and M=4, a super page may be 64 KB, and each super page may contain 16 DUs (assuming 4 KB DU_SZ). In the logical channel domain, for reading 256 KB of consecutive data, a Host may issue 2 super page multiplane (2 planes) read to two dies (e.g., DIE0 and DIE1), respectively to read consecutive data units from the two dies. Each super page read may access 128 KB (64 KB*2) of sequential data. In the physical channel domain, 4 NAND multiplane read commands may be issued at the same time to access each DIE over 4 channels, and a total of 8 NAND read commands may be issued to complete the read operation.

To perform a host WRITE command, when the logical page program data is ready in the host SRAM or other storage unit, the logical to physical command mapping module 810 may parse the logical information such as DEV_ID, ROW_ADDR, COL_ADDR, XFCNT, etc, and split a single logical program operation into M sub-program operations with the physical information: DEV_ID, ROW_ADDR, COL_ADDR/M, XFCNT/M, etc. In various embodiments, the controller 800 may choose any format to distribute one super page into M channels. In one embodiment, if program data is not enough to fill one super page, program data-in suspension may be enabled to allow operations on other DIEs. In another embodiment, if program data is not enough to fill one super page, padding may be enabled to fill the super page. Regardless of whether suspension or padding may be used, a super page program may be finished when all constituent physical pages have been successfully programmed on each physical channel. Moreover, in some embodiments, while waiting for a program operation to be finished on each physical channel, other operations may be allowed to be issued when a corresponding channel is idle.

FIG. 9 schematically shows a storage controller 900 implementing a mapping between a logical channel domain 902 and a physical channel domain 906 in accordance with another embodiment of the present disclosure. The storage controller 900 may be another embodiment of the controller 404 or 700, and an alternative embodiment of the storage controller 800. The logical channel domain 902 may comprise a host command processor 904. The physical channel domain 906 may comprise a NAND device controller unit 908. A logical to physical command mapping module 910 may be positioned between the logical channel domain 902 and the physical channel domain 906 to perform the logical to physical translation. In one embodiment, a HOST may treat an exemplary M-channel NAND storage system having a controller 900 as a virtual p-channel device, with p less than or equal to M, and a super page size being the physical_page_size times M and divided by p (e.g., physical_page_size×M/p). Correspondingly, in one embodiment, the M physical channels may be organized and utilized as p super channels. In the example shown in FIG. 9, p may be equal to two and thus the logical channel domain 902 may comprise two virtual channels 912.1 and 912.2, and the four physical channels may be grouped into two super channels. The HOST may issue a host read or write command to the controller 900. The host command processor 904 in the logical channel domain may be responsible to process the host command to generate parameters corresponding to a logical channel domain and issue a logical page READ or WRITE command. For example, the parameters for the logical channel domain may include the channel identifier (CH_ID), device identifier (DEV_ID), row address (ROW_ADDR), column address (COL_ADDR), transfer count (XFCNT), etc.

To perform a host READ command, when a logical page READ command is issued, the logical to physical command mapping module 910 may parse the logical information such as CH_ID, DEV_ID, ROW_ADDR, COL_ADDR, XFCNT, etc, and split one logical READ operations into M/p sub-READ operations over M/p physical channels with the physical information: CH_ID, DEV_ID, ROW_ADDR, COL_ADDR/M, XFCNT/M, etc. In one embodiment, the physical CH_ID may be different from the logical CH_ID. The M/p sub-READ operations may be carried out by the NAND device controller unit 908 in the physical channel domain 906 on M/p channels. For example, in an embodiment with p=2 and M=4, a super page may comprise two pages in two dies of two different channels, and a logical read operation may be carried out in two physical channels instead of 4 channels.

The controller 900 may check the data availability from each physical channel and request the HOST to perform data transfer using the logical channel information. Once the request is confirmed, the controller 900 may enter a data transfer state with M/p-channel data transfer in parallel. In one embodiment, a synchronization bridge (e.g., in the channel synchronizer and cross-channel bridge 418 or 708) and memory bank (e.g., storage buffer 410 or 706) may be used to align and combine M/p partial data pieces into one complete DU. Once an DU is completely received, a high performance ECC engine may be activated to perform ECC decoding.

To perform a host WRITE command, when the logical page program data is ready in the host SRAM or other storage unit, the logical to physical command mapping module 910 may parse the logical information such as CH_ID, DEV_ID, ROW_ADDR, COL_ADDR, XFCNT, etc, and split a p logical program operation into M/p sub-program operations with the physical information: CH_ID, DEV_ID, ROW_ADDR, COL_ADDR/M, XFCNT/M, etc. In various embodiments, the controller 900 may choose any format to distribute one super page into M/p channels. In one embodiment, if program data is not enough to fill one super page, program data-in suspension may be enabled to allow operations on other DIEs. In another embodiment, if program data is not enough to fill one super page, padding may be enabled to fill the super page. Regardless of whether suspension or padding may be used, a super page program may be finished when all constituent physical pages have been successfully programmed on each physical channel. Moreover, in some embodiments, while waiting for a program operation to be finished on each physical channel, other operations may be allowed to be issued when a corresponding channel is idle.

In one or more embodiments, the number p of virtual logical channels may be selected based on actual implementation and memory resource. In general, the host does not care what the number p may be. An embodiment with only one super channel (e.g., p=1) may be the fastest. But all channels may be involved for accessing one super page, and cannot do anything else when one super page is being accessed. Therefore, embodiments of a storage controller having a number p larger than one may provide support for multiple i/o streams and can do things in parallel.

Figure 10:
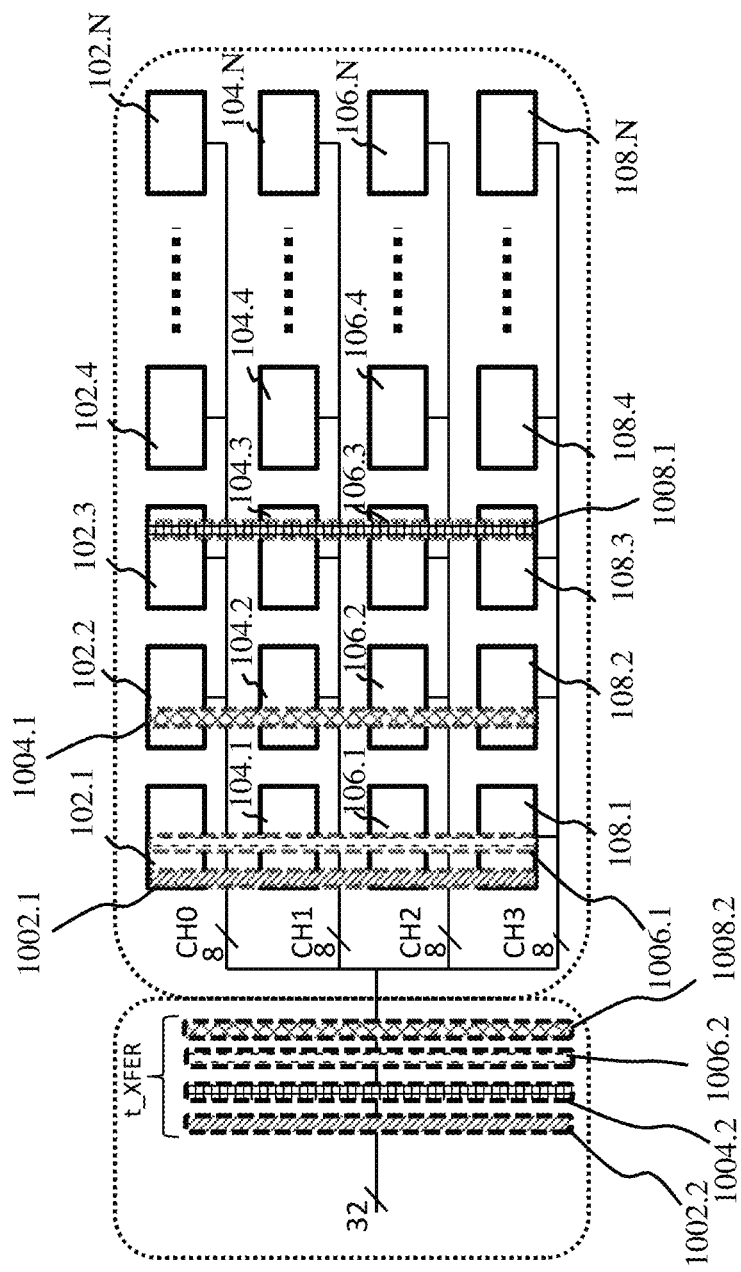
FIG. 10 schematically shows a random read from a multi-channel NAND storage device in accordance with an embodiment of the present disclosure.

FIG. 10 schematically shows a random read from a multi-channel NAND storage device in accordance with an embodiment of the present disclosure. An exemplary NAND storage device 100 may have data units 1002.1, 1004.1, 1006.1 and 1008.1. The data unit 1002.1 may be split into 4 pieces with each piece stored on dies 102.1, 104.1, 106.1 and 108.1, respectively. The data unit 1004.1 may be split into 4 pieces with each piece stored on dies 102.2, 104.2, 106.2 and 108.2, respectively. The data unit 1006.1 may be split into 4 pieces with each piece stored on dies 102.1, 104.1, 106.1 and 108.1, respectively. The data unit 1008.1 may be split into 4 pieces with each piece stored on dies 102.3, 104.3, 106.3 and 108.3, respectively.

In an example, assuming each physical page has a size of 16 KB, and a super page may be 64 KB and may contain 16 DUs (assuming 4 KB DU_SZ). A HOST may issue a 4 KB read to read data contained in the data units 1002.1, 1004.1, 1006.1 and 1008.1. In the logical channel domain, the Host may issue a random 4 K page read. In the physical channel domain, 4 NAND read commands may be issued at the same time to access 1 KB data from each of 4 channels, and the data units 1002.1, 1004.1, 1006.1 and 1008.1 may be retrieved as 1002.2, 1004.2, 1006.2 and 1008.2 on the super channel. In one embodiment, the data pieces retrieved from the 4 channels may be assembled into one or more ECC codewords that can be decoded.

Figure 11:
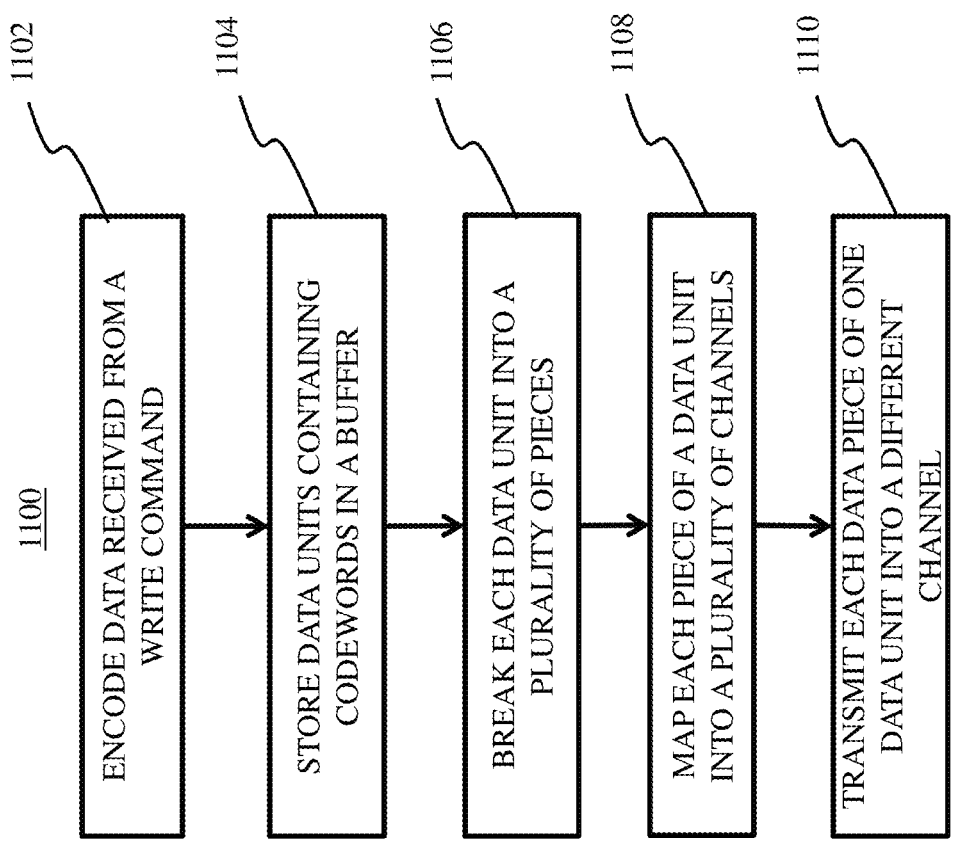
FIG. 11 is a flowchart of a process for programming a multi-channel NAND storage device in accordance with an embodiment of the present disclosure.

FIG. 11 is a flowchart of a process 1100 for programming a multi-channel NAND storage device in accordance with an embodiment of the present disclosure. In block 1102, data received from a write command may be encoded into a plurality of codewords. For example, a non-volatile storage system may comprise a non-volatile storage device (e.g., a NAND device). The non-volatile storage system may be used to store data for a host device (e.g., a computing system) and may encode data received in a write command from the host device into ECC codewords for storage. In block 1104, a plurality of data units formed by the plurality of codewords may be stored in a buffer. For example, the data buffer 410 or the data buffer 702 of a storage controller may be used to temporality store data units before these data units may be stored into the storage device. The buffer may be implemented in a memory bank with high bandwidth. In one embodiment, each data unit may contain one ECC codeword. In another embodiment, each data unit may contain multiple ECC codewords.

In block 1106, each of the plurality of data units may be broken into a plurality of data pieces. In various embodiments, each codeword may be broken into multiple pieces. In one embodiment, the pieces may be generated by partition a codeword into consecutive parts. In another embodiment, the pieces may be generated in an interleaved manner as interleaved pieces. In block 1108, each of the plurality of data pieces of a data unit may be mapped into one of the plurality of channels. In various embodiments, data pieces of one codeword may be spread into multiple channels. In block 1110, each of the plurality of data pieces of a data units may be transmitted into one of the plurality of channels to be stored in a die of a respective channel. In various embodiments, spreading an ECC codeword through multiple non-volatile device (e.g., NAND device) dies may achieve an averaging effect, and therefore reduce ECC failures.

Figure 12:
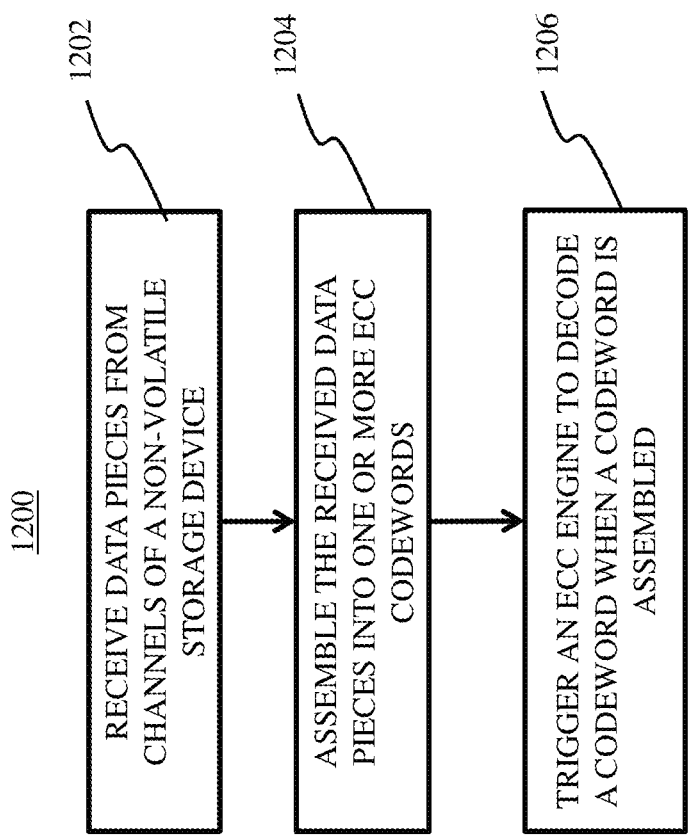
FIG. 12 is a flowchart of a process for reading data from multi-channel NAND storage device in accordance with an embodiment of the present disclosure.

FIG. 12 is a flowchart of a process 1200 for reading data from multi-channel NAND storage device in accordance with an embodiment of the present disclosure. In block 1202, data pieces may be received from channels of a non-volatile storage device. For example, a read command from a host may be converted into a plurality of read operations and the plurality of read operations may be performed on a plurality of channels of a non-volatile storage device (e.g., a multi-channel NAND storage device) in parallel. Data pieces for one or more data units may be received from the plurality of channels of the non-volatile storage device. In one embodiment, the plurality of channels may be treated collectively as a super channel. In block 1204, the received data pieces may be assembled into one or more ECC codewords. For example, data stored in the dies of a NAND device may be received in an exemplary controller and assembled into one or more error correction code (ECC) encoded codewords. Each codeword may have two or more data pieces retrieved from different channels. In block 1206, an ECC engine may be triggered to decode a codeword when the codeword is assembled. In an embodiment, an exemplary storage controller may be configured to decode ECC codeword(s) to generate decoded data to be returned to the host.

The processes 1100 and 1200 may be implemented using software (e.g., executable by a computer processor (CPU, GPU, or both)), hardware (e.g., a field-programmable gate array (FPGA) or an application-specific IC (ASIC), firmware, or any suitable combination of the three. In one embodiment, for example, components of a storage controller (e.g., the host command processor 804 or 904, and the logical to physical command mapping module 810 or 910) may be implemented in hardware circuitry. Moreover, the process 1100 and 1200 may be performed in hardware. In another embodiment, for example, components of a storage controller (e.g., the host command processor 804 or 904, and the logical to physical command mapping module 810 or 910) may be implemented in software. And the processes 1100 and 1200 may be programmed in computer processor executable instructions and performed by a computer processor (e.g., a microprocessor or a microcontroller) executing the executable instructions.

In an exemplary embodiment, there is provided a method for reading data from a non-volatile storage device. The method may comprise: receiving data pieces from the plurality of channels of the non-volatile storage device, assembling the data pieces into one or more error correction code (ECC) encoded codewords, and triggering an ECC engine to decode a codeword to generate decoded data to be returned to the host when the codeword is assembled. Each codeword may have data pieces retrieved from different channels.

In one embodiment, the method may further comprise transmitting data pieces of a data unit on a super channel that has a bandwidth equal to bandwidths of the plurality of channel combined. The data unit may comprise a plurality of data pieces each being transmitted via a respective channel.

In one embodiment, each channel of the non-volatile storage device may comprise a plurality of dies, and an ECC codeword may be spread among multiple dies located at different channels.

In one embodiment, the ECC codeword may be spread among multiple dies in an interleaved manner.

In one embodiment, the data pieces may be assembled into one or more data units with each data unit being one ECC codeword, and the data pieces of a data unit may be assembled according to its original position in the data unit.

In one embodiment, the data pieces may be assembled into one or more data units with each data unit comprising more than one ECC codeword, and the data pieces of a data unit may be assembled according to its original position in the data unit.

In one embodiment, the method may further comprise encoding data received from a write command into a plurality of codewords, storing a plurality of data units formed by the plurality of codewords in a buffer, breaking each of the plurality of data units into a plurality of data pieces, with each codeword being broken into multiple pieces, mapping each of the plurality of data pieces of a data unit into one of the plurality of channels, with data pieces of one codeword being spread into multiple channels, and transmitting each of the plurality of data pieces of the data unit into one of the plurality of channels to be stored in a die of a respective channel.

In one embodiment, the method may further comprise monitoring and synchronizing data traffic on the plurality of channels and locating a first super page across the plurality of channels for storing the data received from the write command.

In another exemplary embodiment, there is provided a controller comprising an error correction code (ECC) engine configured to encode data into codewords and decode the codewords, a buffer to store data units formed by the codewords, a cross-channel bridge to distribute a plurality of pieces of a data unit (DU) to a plurality of channels of a non-volatile storage device for a write operation and assemble the plurality of pieces retrieved from the plurality of channels for a read operation. Each of the plurality of pieces of the DU may be stored in a separate die of a different channel of the plurality of channels. The controller may further comprise a channel synchronizer to balance data unit pieces received from different channels and trigger the ECC engine whenever a ECC codeword is received.

In one embodiment, each data unit may contain one ECC codeword.

In one embodiment, each data unit may contain two or more ECC codewords.

In one embodiment, the ECC may be is a multi-core ECC engine.

In one embodiment, the controller may further comprise circuitry configured to map a logical channel domain operation into a physical channel domain operation.

In one embodiment, the buffer may be a memory bank with a high throughput.

In yet another exemplary embodiment, there is provided a non-transitory machine-readable medium having information, wherein the information, when read by a hardware processor system, causes the hardware processor system to perform: receiving data pieces from the plurality of channels of the non-volatile storage device, assembling the data pieces into one or more error correction code (ECC) encoded codewords, and triggering an ECC engine to decode a codeword to generate decoded data to be returned to the host when the codeword is assembled. Each codeword may have data pieces retrieved from different channels.

In one embodiment, each channel of the non-volatile storage device may comprise a plurality of dies, and an ECC codeword may be spread among multiple dies located at different channels.

In one embodiment, the data pieces may be assembled into one or more data units with each data unit comprising one or more ECC codewords, and the data pieces of a data unit may be assembled according to its original position in the data unit.

In one embodiment, the information, when read by the hardware processor system, may further cause the hardware processor system to perform: encoding data received from a write command into a plurality of codewords, storing the plurality of codewords in a buffer, breaking each of the plurality of codewords into a plurality of data pieces, mapping each of the plurality of data pieces of a codeword into a plurality of channels, and transmitting each of the plurality of data pieces of data units into one of the plurality of channels to be stored in a die of a respective channel.

In one embodiment, the information, when read by the hardware processor system, may further cause the hardware processor system to perform: monitoring and synchronizing data traffic on the plurality of channels and locating a first super page across the plurality of channels for the data received from the write command.

Any of the disclosed methods and operations may be implemented as computer-executable instructions (e.g., software code for the operations described herein) stored on one or more computer-readable storage media (e.g., non-transitory computer-readable media, such as one or more optical media discs, volatile memory components (such as DRAM or SRAM), or nonvolatile memory components (such as hard drives)) and executed on a device controller (e.g., firmware executed by ASIC). Any of the computer-executable instructions for implementing the disclosed techniques as well as any data created and used during implementation of the disclosed embodiments can be stored on one or more computer-readable media (e.g., non-transitory computer-readable media).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for reading data from a non-volatile storage device, comprising:
   receiving data pieces from a plurality of channels of the non-volatile storage device;
   assembling the data pieces into one or more error correction code (ECC) encoded codewords at a cross-channel bridge coupled to the plurality of channels of the non-volatile storage device, each codeword having data pieces retrieved from different channels; and
   triggering an ECC engine to decode a codeword to generate decoded data to be returned to a host when the codeword is assembled.

2. The method of claim 1, further comprising transmitting data pieces of a data unit on a super channel that has a bandwidth equal to bandwidths of the plurality of channels combined, the data unit comprising a plurality of data pieces each being transmitted via a respective channel.

3. The method of claim 1, wherein each channel of the non-volatile storage device comprises a plurality of dies, and an ECC codeword is spread among multiple dies located at different channels.

4. The method of claim 3, wherein the ECC codeword is spread among the multiple dies in an interleaved manner.

5. The method of claim 4, wherein the ECC codeword is split into M interleaved pieces, with M being a number of channels for the plurality of channels and larger than one, a first data piece of the M interleaved pieces containing a first bit of the ECC codeword and every M-th bit from the first bit, a second data piece of the M interleaved pieces containing a second bit of the ECC codeword and every M-th bit from the second bit, until a last data piece of the M interleaved pieces containing a M-th bit of the ECC codeword and every M-th bit from the M-th bit.

6. The method of claim 1, wherein the data pieces are assembled into one or more data units with each data unit including one or more ECC codewords, and the data pieces of a data unit is assembled according to its original position in the data unit.

7. The method of claim 1, wherein the non-volatile storage device is one of: a NAND flash memory, a NOR flash memory, a magnetoresistive random Access Memory (MRAM), a resistive random access memory (RRAM), a phase change random access memory (PCRAM), and a Nano-RAM.

8. The method of claim 1, further comprising encoding data received from a write command into a plurality of codewords;
   storing a plurality of data units formed by the plurality of codewords in a buffer;
   breaking each of the plurality of data units into a plurality of data pieces, with each codeword being broken into multiple pieces;
   mapping each of the plurality of data pieces of a data unit into one of the plurality of channels, with data pieces of one codeword being spread into multiple channels; and
   transmitting each of the plurality of data pieces of the data unit into one of the plurality of channels to be stored in a die of a respective channel.

9. The method of claim 8, further comprising:
monitoring and synchronizing data traffic on the plurality of channels; and
locating a first super page across the plurality of channels for storing the data received from the write command.

10. A controller, comprising:
an error correction code (ECC) engine configured to encode data into codewords and decode the codewords;
a buffer to store data units formed by the codewords;
a cross-channel bridge coupled to a plurality of channels of a non-volatile storage device to distribute a plurality of pieces of a data unit (DU) to the plurality of channels for a write operation and assemble the plurality of pieces retrieved from the plurality of channels for a read operation, wherein each of the plurality of pieces of the DU is to be stored in a separate die of a different channel of the plurality of channels; and
a channel synchronizer to balance data unit pieces received from different channels and trigger the ECC engine whenever an ECC codeword is received.

11. The controller of claim 10, wherein each data unit contains one ECC codeword.

12. The controller of claim 10, wherein each data unit contains two or more ECC codewords.

13. The controller of claim 10, wherein the ECC engine is a multi-core ECC engine.

14. The controller of claim 10, further comprising circuitry configured to map a logical channel domain operation into a physical channel domain operation.

15. The controller of claim 10, wherein the buffer is a memory bank with a high throughput.

16. A non-transitory machine-readable medium having information, wherein the information, when executed by a hardware processor system, causes the hardware processor system to perform:
receiving data pieces from a plurality of channels of a non-volatile storage device;
assembling the data pieces into one or more error correction code (ECC) encoded codewords at a cross-channel bridge coupled to the plurality of channels of the non-volatile storage device, each codeword having data pieces retrieved from different channels; and
triggering an ECC engine to decode a codeword to generate decoded data to be returned to a host when the codeword is assembled.

17. The non-transitory machine-readable medium of claim 16, wherein the information, when executed by the hardware processor system, further causes the hardware processor system to perform:
transmitting data pieces of a data unit on a super channel that has a bandwidth equal to bandwidths of the plurality of channels combined, the data unit comprising a plurality of data pieces each being transmitted via a respective channel.

18. The non-transitory machine-readable medium of claim 16, wherein each channel of the non-volatile storage device comprises a plurality of dies, and an ECC codeword is spread among multiple dies located at different channels.

19. The non-transitory machine-readable medium of claim 16, wherein the data pieces are assembled into one or more data units with each data unit comprising one or more ECC codewords, and the data pieces of a data unit is assembled according to its original position in the data unit.

20. The non-transitory machine-readable medium of claim 16, wherein the information, when executed by the hardware processor system, further causes the hardware processor system to perform:
encoding data received from a write command into a plurality of codewords;
storing the plurality of codewords in a buffer;
breaking each of the plurality of codewords into a plurality of data pieces;
mapping each of the plurality of data pieces of a codeword into a plurality of channels; and
transmitting each of the plurality of data pieces of data units into one of the plurality of channels to be stored in a die of a respective channel.

21. The non-transitory machine-readable medium of claim 20, wherein the information, when executed by the hardware processor system, further causes the hardware processor system to perform:
monitoring and synchronizing data traffic on the plurality of channels; and
locating a first super page across the plurality of channels for the data received from the write command.

* * * * *